(12) United States Patent
Song et al.

(10) Patent No.: US 7,663,781 B2
(45) Date of Patent: Feb. 16, 2010

(54) IMAGE FORMING DEVICE AND CONTROLLING METHOD WITH RECORDING MATERIAL STORAGE UNIT HAVING REPLACEABLE MEMORY STORING COLOR CONVERSION TABLES SELECTED BASED ON IMAGE FORMING DEVICE STATUS

(75) Inventors: Won-ho Song, Seoul (KR); Byung-tae Kang, Youngin-si (KR); Man-chan Kim, Suwon-si (KR); Jae-kyoo Kang, Yongin-si (KR); Tae-sun Yoon, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 11/268,465

(22) Filed: Nov. 8, 2005

(65) Prior Publication Data

US 2006/0114482 A1 Jun. 1, 2006

(30) Foreign Application Priority Data

Dec. 1, 2004 (KR) .................. 10-2004-0100073

(51) Int. Cl.
*G06K 15/02* (2006.01)
*H04N 1/60* (2006.01)
(52) U.S. Cl. .................. 358/1.9; 358/3.24; 358/1.13; 358/1.16; 358/518; 358/523
(58) Field of Classification Search .................. 358/1.9, 358/3.21–3.24, 1.13, 518, 523, 504, 1.16; 347/9, 15, 19, 115, 152, 158; 399/24–30
See application file for complete search history.

(56) References Cited

U.S. PATENT DOCUMENTS

| 5,208,631 | A | * | 5/1993 | Jacobs et al. .................. 399/28 |
| 5,479,272 | A | * | 12/1995 | Saito .......................... 358/518 |
| 5,847,850 | A | * | 12/1998 | Kadowaki .................... 358/523 |
| 6,145,950 | A | * | 11/2000 | Ohtsuka et al. ............... 347/15 |

(Continued)

FOREIGN PATENT DOCUMENTS

CN 1499320 5/2004

(Continued)

OTHER PUBLICATIONS

Chinese Office Action dated Mar. 14, 2008 issued in CN 2005-101272998.

*Primary Examiner*—Scott A Rogers
(74) *Attorney, Agent, or Firm*—Stanzione & Kim LLP

(57) ABSTRACT

An image forming device and a controlling method thereof, in which the image forming device includes: a customer replaceable unit memory (CRUM) associated with a recording material storage medium to store a color conversion table group including a color conversion table that corresponds to status information of the image forming device, and a controller to determine current status information of the image forming device, to read a target color conversion table from among the color conversion table group according to the determined current status information, and to apply the target color conversion table to perform a printing operation on a document. Therefore, an optimum print quality can be guaranteed according to the determined current status of the image forming device.

31 Claims, 7 Drawing Sheets

U.S. PATENT DOCUMENTS

| | | | |
|---|---|---|---|
| 6,572,212 B2 * | 6/2003 | Konno et al. | 347/19 |
| 6,791,710 B1 * | 9/2004 | Bannai | 358/1.2 |
| 6,837,565 B2 * | 1/2005 | Studholme et al. | 347/19 |
| 6,940,612 B1 * | 9/2005 | Murai | 358/518 |
| 7,259,890 B2 * | 8/2007 | Jeran | 358/1.9 |
| 7,324,232 B2 * | 1/2008 | Ishibashi et al. | 358/1.15 |
| 7,417,764 B2 * | 8/2008 | Rich | 358/1.9 |
| 2004/0223775 A1 * | 11/2004 | Ito et al. | 399/27 |
| 2005/0083558 A1 * | 4/2005 | Kim | 358/523 |
| 2005/0231748 A1 * | 10/2005 | Lee et al. | 358/1.13 |
| 2006/0250425 A1 * | 11/2006 | Nambudiri et al. | 347/7 |
| 2006/0256173 A1 * | 11/2006 | Tatsumi et al. | 347/86 |
| 2008/0151276 A1 * | 6/2008 | Mori | 358/1.9 |

FOREIGN PATENT DOCUMENTS

| | | |
|---|---|---|
| JP | 10-309846 | 11/1998 |
| JP | 2004-1512 | 1/2004 |
| KR | 2004-49530 | 6/2004 |

* cited by examiner

IMAGE FORMING DEVICE AND CONTROLLING METHOD WITH RECORDING MATERIAL STORAGE UNIT HAVING REPLACEABLE MEMORY STORING COLOR CONVERSION TABLES SELECTED BASED ON IMAGE FORMING DEVICE STATUS

CROSS-REFERENCE TO RELATED APPLICATIONS

This application claims the benefit under 35 U.S.C. § 119 of Korean Patent Application No. 2004-100073 filed on Dec. 1, 2004 in the Korean Intellectual Property Office, the entire content of which is incorporated herein by reference.

BACKGROUND OF THE INVENTION

1. Field of the Invention

The present general inventive concept relates in general to an image forming device and a controlling method thereof, and more specifically, to an image forming device having a customer replaceable unit memory (CRUM) associated with a recording material storage medium and a controlling method thereof.

2. Description of the Related Art

Image forming devices form (i.e., print) images that correspond to an original input image data on recording media, such as printing papers. Typical examples of the image forming devices include printers, copiers, fax machines, etc.

In general, an image forming device uses a plurality of color conversion tables to execute printing operations. Examples of the color conversion tables include an RGB-CMYK color-matching table ('color-matching table'), a halftone color table, a color lookup table (CLUT), or the like. The color-matching table is used to convert all image data from RGB to CMYK. The halftone color table is used for a halftoning process. The color lookup table is used for color correction.

Traditionally, the image forming device was equipped with only one color conversion table for the printing operation. For instance, in a conventional black and white image forming device, the one color conversion table is used for the printing operation and a resulting print quality does not substantially deteriorate.

However, when using the one color conversion table in a conventional color image forming device to execute the printing operation, the resulting print quality is substantially deteriorated, regardless of a status of the color image forming device.

Particularly, when using a color conversion table without considering specification information of the image forming device and usage information of the customer replaceable unit (e.g., a residual quantity of the recording material), it is often difficult to produce an optimum print quality desired by a user.

SUMMARY OF THE INVENTION

The present general inventive concept provides an image forming device and a controlling method thereof. The image forming device reads a target color conversion table to obtain an optimum print quality according to current status information of the image forming device from among a color conversion table group stored in a customer replaceable unit memory (CRUM) and applies the target color conversion table to a printing operation.

The present general inventive concept also provides an image forming device and a controlling method thereof. The image forming device may read a target color conversion table from among a color conversion table group stored in a customer replaceable unit memory (CRUM) and applies the read target color conversion table to a printing operation when a recording material storage medium installed therein is usable only with the image forming device. Accordingly, the image forming device may obtain an optimum print quality according to current status information of the image forming device.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image forming device having a recording material stored in a recording material storage medium, the device including a customer replaceable unit memory (CRUM) associated with the recording material storage medium to store a color conversion table group including at least one color conversion table that corresponds to at least one status information of the image forming device, and a controller to determine current status information of the image forming device, to read a target color conversion table from among the color conversion table group according to the determined current status information, and to perform a color conversion process by applying the target color conversion table.

The color conversion table group may comprise at least one of an RGB-CMYK color-matching table group, a halftone color table group, and a color lookup table group.

The status information may include at least one of specification information of the image forming device and usage information of replaceable units installed in the image forming device.

The specification information of the image forming device may include at least one of a PPM (Page Per Minute) number, a size of printing paper, an availability of a network function, an availability of a double sided printing function, a resolution, a print density, and an image mode.

The image forming device may further include an input unit to receive a command to change the specification information of the image forming device.

The CRUM may further store information about the recording material storage medium including at least one of an authenticity thereof and a model name thereof, and the controller determines whether the recording material storage medium is usable only with the image forming device based on the information about the recording material storage medium, and if the recording material storage medium is determined to be usable only with the image forming device the controller reads the target color conversion table.

The recording material storage medium may further include a transmitter to transmit the information about the recording material storage medium, if the recording material storage medium is installed in the image forming device. Additionally, the image forming device may further include a receiver to receive the information about the recording material storage medium from the transmitter and to provide the received information about the recording material storage medium to the controller.

The foregoing and/or other aspects of the present general inventive concept may also be achieved by providing a controlling method of an image forming device having a recording material stored in a recording material storage medium, the method including determining current status information of the image forming device, based on the determined current status information, reading from a customer replaceable unit memory (CRUM) associated with the recording material storage medium a target color conversion table from among a color conversion table group that includes at least one color conversion table that corresponds to at least one of the status information of the image forming device, and performing a color conversion process by applying the read target color conversion table.

If the recording material storage medium is installed in the image forming device, the controlling method may further include determining whether the recording material storage medium is usable only with the image forming device according to information about the recording material storage medium including at least one of an authenticity thereof and a model name thereof stored in the CRUM, and if the recording material storage medium is determined to be usable only with the image forming device, reading the target color conversion table.

If the recording material storage medium is determined not to be usable only with the image forming device, the controlling method may further include performing the color conversion process by applying a predetermined default color conversion table.

The foregoing and/or other aspects of the present general inventive concept may also be achieved by providing a host device in communication with an image forming device, the host device including a second interface to receive a target color conversion table based on determined current status information of the image forming device, and the target color conversion table is included in a color conversion table group comprising at least one color conversion table that corresponds to at least one status information of the image forming device and is stored in a customer replaceable memory (CRUM) associated with a recording material storage medium of the image forming device, and a printer driver to perform a color conversion process by applying the received target color conversion table.

The color conversion table group may comprise at least one of an RGB-CMYK color-matching table group, a halftone color table group, and a color lookup table group.

The status information may include at least one of specification information of the image forming device and usage information of replaceable units installed in the image forming device.

The specification information of the image forming device may include at least one of a PPM (Page Per Minute) number, a size of printing paper, an availability of a network function, an availability of a double sided printing function, resolution, a print density, and an image mode.

The printer driver may provide a graphic user interface (GUI) to enable a user to change the specification information of the image forming device.

The foregoing and/or other aspects of the present general inventive concept may also be achieved by providing a controlling method of a host device in communication with an image forming device, the method including receiving a target color conversion table based on determined current status information of the image forming device, and the target color conversion table is included in a color conversion table group comprising at least one color conversion table that corresponds to at least one status information of the image forming device and is stored in a customer replaceable memory (CRUM) associated with a recording material storage medium of the image forming device, and performing a color conversion process by applying the received target color conversion table.

The status information may include at least one of specification information of the image forming device and usage information of replaceable units installed in the image forming device.

The specification information of the image forming device may comprise at least one of a PPM (Page Per Minute) number, a size of printing paper, an availability of a network function, an availability of a double sided printing function, a resolution, a print density, and an image mode.

The foregoing and/or other aspects of the present general inventive concept may also be achieved by providing an image forming device, comprising a replaceable storage medium containing a recording material and having a replaceable memory to store a plurality of color conversion tables, and a controller to select one of the plurality of color conversion tables according to status information to convert an image signal to be printer.

The foregoing and/or other aspects of the present general inventive concept may also be achieved by providing a recording material storage medium usable with an image forming device, comprising a CRUM to store information about the recording material storage medium and color conversion information.

The foregoing and/or other aspects of the present general inventive concept may also be achieved by providing an image forming system, comprising a memory to store a plurality of color conversion tables each corresponding to at least one of specification information and usage information, and a controller to select one of the plurality of color conversion tables as a target color conversion table according to status information of the image forming system to convert print data to be printed on a sheet of paper.

The foregoing and/or other aspects of the present general inventive concept may also be achieved by providing an image forming system, comprising a memory to store a plurality of color conversion tables corresponding to reference status information, and a controller to transmit at least one of the plurality color conversion tables to an external device upon request of one of the plurality of color conversion tables according to current status information thereof from the external device, to receive print data relating to the at least one of the plurality of color conversion tables from the external device, and to print the received print data on a recording medium without conversion.

The foregoing and/or other aspects of the present general inventive concept may also be achieved by providing an image forming device, comprising at least one memory to store current status information about the image forming device and a plurality of color conversion tables that correspond to a plurality of possible statuses of the image forming device, and a controller to select a target color conversion table to be applied in a color conversion process according to the current status information.

The foregoing and/or other aspects of the present general inventive concept may also be achieved by providing a method of controlling an image forming device, the method comprising storing current status information about the image forming device and a plurality of color conversion tables that correspond to a plurality of possible statuses of the image forming device, and selecting a target color conversion table to be applied in a color conversion process according to the current status information.

The foregoing and/or other aspects of the present general inventive concept may also be achieved by providing an image forming system, including an image forming device to read and transmit a target color conversion table based on determined current status information thereof, and the target color conversion table is included in a color conversion table group comprising at least one color conversion table that corresponds to at least one status information of the image forming device and is stored in a customer replaceable memory (CRUM) associated with a recording material storage medium of the image forming device, and a host device to perform a color conversion process by applying the transmitted target color conversion table.

The image forming device in the image forming system may include the customer replaceable unit memory (CRUM) associated with the recording material storage medium to store the color conversion table group including the at least one color conversion table that corresponds to the at least one status information of the image forming device, and a controller to determine the current status information of the image forming device, to read the target color conversion table from among the color conversion table group according to the determined current status information, and to transmit the target color conversion table to the host device.

The host device in the image forming system may include a printer driver to perform the color conversion process by applying the transmitted target color conversion table.

The foregoing and/or other aspects of the present general inventive concept may also be achieved by providing an image forming system, comprising an image forming device to select a target color conversion table from among a plurality of color conversion tables according to current status information thereof.

The foregoing and/or other aspects of the present general inventive concept may also be achieved by providing a controlling method of an image forming system including an image forming device having a recording material stored in a recording material storage medium and a host device in communication with the image forming device, the method including determining current status information of the image forming device, based on the determined current status information, reading from a customer replaceable unit memory (CRUM) associated with the recording material storage medium a target color conversion table from among a color conversion table group that includes at least one color conversion table that corresponds to at least one status information of the image forming device, transmitting the target color conversion table from the image forming device to the host device, and performing a color conversion process by applying the transmitted target color conversion table.

If the recording material storage medium is installed in the image forming device, the controlling method may further include determining whether the recording material storage medium is usable only with the image forming device according to information stored in the CRUM about the recording material storage medium including at least one of an authenticity thereof and a model name thereof stored, and if the recording material storage medium is determined to be usable only with the image forming device, reading the target color conversion table.

If the recording material storage medium is determined not to be usable only with the image forming device, the controlling method may further include performing the color conversion process by applying a predetermined default color conversion table.

The foregoing and/or other aspects of the present general inventive concept may also be achieved by providing a computer readable medium containing executable code to control an image forming device, the medium comprising a first executable code to store current status information about the image forming device and a plurality of color conversion tables that correspond to a plurality of possible statuses of the image forming device, and a second executable code to select a target color conversion table to be applied in a color conversion process according to the current status information.

Accordingly, an optimum print quality can be obtained according to the current status information of the image forming device.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
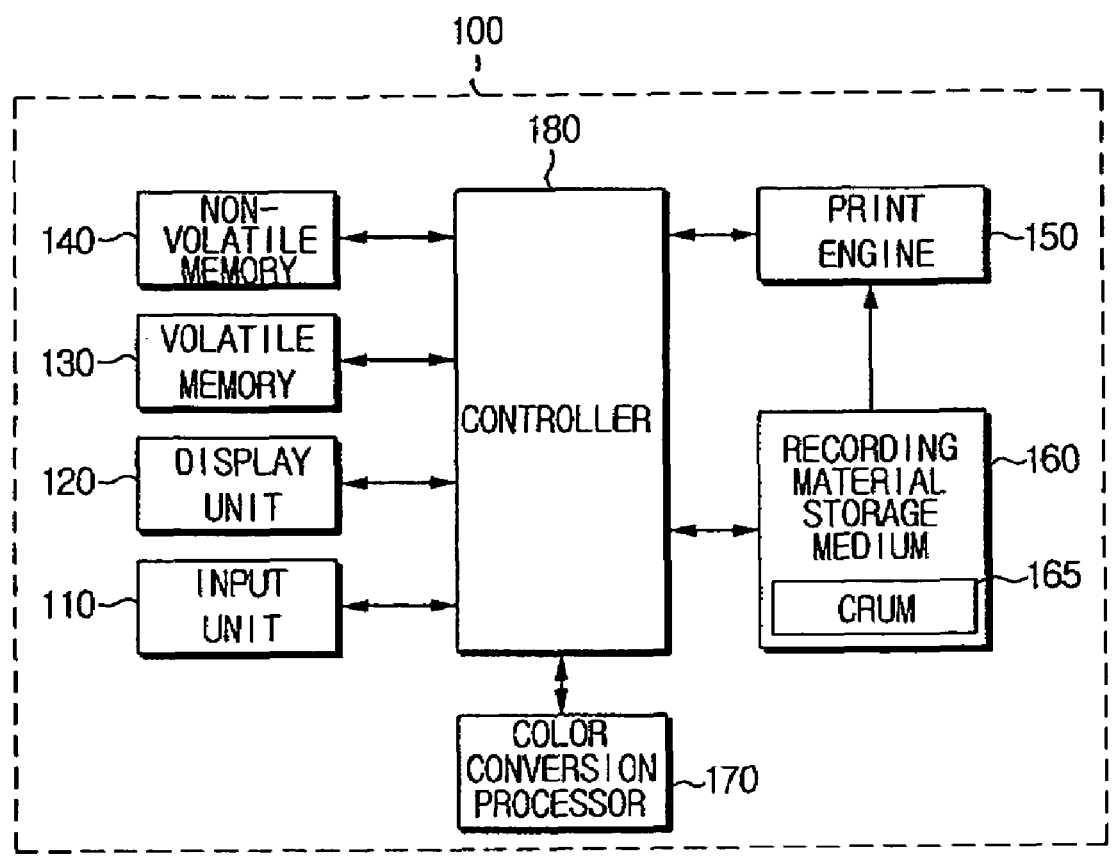
FIG. 1 is a schematic block diagram illustrating a printer according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

It should be understood that a printer(s), referred to throughout this description, is applied as an image forming device, by way of example only, and is not intended to limit the scope of the general inventive concept. Other types of image forming devices may also be used with the present general inventive concept.

FIG. 1 is a schematic block diagram illustrating a printer 100 according to an embodiment of the present general inventive concept.

Referring to FIG. 1, the printer 100 includes an input unit 110, a display unit 120, a volatile memory 130, a non-volatile memory 140, a print engine 150, a recording material storage medium 160, a color conversion processor 170, and a controller 180.

The input unit 110 includes at least one operating button to enable a user to input user commands. A user command signal input through the input unit 110 is provided to the controller 180. The controller 180 controls the printer 100 in response to the user command signal.

Specification information of the printer 100 may also be input through the input unit 110. Generally, the specification information is stored (or pre-stored) in the non-volatile memory 140 (described below) by the controller 180. The specification information may also be updated by new specification information.

The display unit 120 displays all types of notification messages to be viewable by the user, in response to a user command and/or the control of the controller 180.

The volatile memory 130 temporarily stores data that is produced during the operation of the printer 100.

The non-volatile memory 140 stores a control program to control overall operation of the printer 100.

The non-volatile memory 140 may store current status information of the printer 100. The status information includes the specification information of the printer 100 and usage information of a replaceable unit (i.e., a customer replaceable unit) installed in the printer 100. The replaceable unit may be a toner cartridge, a photosensitive drum, a developing unit, etc, and the usage information may be an amount of a material used in the replaceable unit and the printer 100 or a lifetime of the replaceable unit. In the following description, the usage information of the replaceable unit is described as a residual quantity of a recording material (e.g., a toner or a developer). However, it should be understood that the replaceable unit and/or the corresponding usage information thereof may refer to any replaceable part and/or expendable commodity usable in the printer 100. The specification information of the printer 100 contains a PPM (Page Per Minute) number, a size of printing paper, an availability of a network function, an availability of a double sided printing function, a resolution, a print density, an image mode, etc. Here, the image mode refers to a text enhancement/image enhancement function. The current status information of the printer 100 can be stored in a customer replaceable unit memory (CRUM) 165 of the recording material storage medium 160 (described below).

The non-volatile memory 140 stores an application table having a plurality of color conversion tables that can be applied. The application table provides information that is necessary to produce an optimum print quality using one or more color conversion tables selected according to the current status information of the printer 100. That is, the controller 180 selects the one or more color conversion tables to be applied in a color conversion process. The application table can be stored in the CRUM 165 of the recording material storage medium 160 (described below).

Figure 2:
FIG. 2 illustrates an application table including a plurality of color-matching tables according to an embodiment of the present general inventive concept.
Figure 3:
FIG. 3 illustrates an application table including a plurality of halftone color tables and a plurality of color lookup tables according to another embodiment of the present general inventive concept.

FIG. 2 illustrates an application table including a plurality of color-matching tables according to an embodiment of the present general inventive concept, and FIG. 3 illustrates an application table including a plurality of halftone color tables and a plurality of color lookup tables according to another embodiment of the present general inventive concept. However, it should be understood that these application tables 200 and 300 are exemplary and are not intended to limit the scope of the present general inventive concept. Other applications tables may also be used with the present general inventive concept. For example, the application table may include a first application table (e.g., 200) having the color matching tables and a second application table (e.g., 300) having the halftone color tables and the color lookup tables. Alternatively, a single application table may include the color matching tables, the halftone color tables, and the color lookup tables.

The print engine 150 executes the printing operation under the control of the controller 180. In other words, the controller 180 controls the print engine 150, so that the print engine 150 can execute the printing operation using the recording material stored in the recording material storage medium 160.

The recording material storage medium 160 stores the recording material that is used to print document on the printing paper. For example, a toner may be used as the recording material. The recording material storage medium 160 may be a toner cartridge.

When the printer 100 is a black and white printer, the printer 100 may only use a one-color recording material, thus a single recording material storage medium is sufficient for the printer 100.

If the printer 100 is a color printer that uses a plurality of colors of recording material, a single recording material storage medium may still be used. In this case, the recording material storage medium can be divided into a plurality of partitioned spaces to store the plurality of recording materials by color. However, when the printer 100 uses a plurality of recording material storage mediums, the plurality of recording material storage mediums store different colors of the corresponding plurality of recording materials.

The customer replaceable unit memory (CRUM) 165 may be provided at a designated position of the recording material storage medium 160, and may be attached to and detached from the recording material storage medium 160, and replaced with a new one. The CRUM 165 may be replaced together with the recording material storage medium 160. The CRUM 165 may detect changes of the recording material in amount to generate the usage information and provide the usage information to the controller 180.

The CRUM 165 may store information about the residual quantity (i.e., usage information) of the recording material, a number of printed pages, a printer model, a printer serial number, information about replaceable units installed in the printer 100, and control programs for the replaceable units.

In particular, the CRUM 165 stores at least one color conversion table group. The at least one color conversion table group may include, for example, a color-matching table group, a halftone color table group, a color lookup table group, and/or other color table groups.

The color-matching table group, the halftone color table group, and the color lookup table group each include at least one table, respectively, to guarantee the optimum print quality according to the current status information of the printer 100. That is, the one or more color conversion tables can be selected from among the color matching table group, the halftone color table group, and the color lookup table group according to the current status information of the printer 100 such that optimum print quality can be obtained. For example, the one or more color conversion tables may be selected from the application table(s) illustrated in FIGS. 2 and 3.

In particular, the color-matching table group includes at least one color-matching table that guarantees the optimum print quality based on the specification information of the status information of the printer 100. In other words, the color matching table group includes color matching tables that correspond to varying specification information to produce the optimum print quality.

In addition, the halftone color table group and/or the color lookup table group include at least one halftone color table and/or at least one color lookup table, respectively, to guarantee the optimum print quality based on the usage information (e.g., the residual quantity) of the recording material from among the current status information of the printer 100.

That is, a halftone color table and a color lookup table can be selected according to the usage information of the recording material.

The controller 180 controls the overall operation of the printer 100 according to the control program stored in the non-volatile memory 140.

The controller 180 reads the current status information of the printer 100 from the non-volatile memory 140 or the CRUM 165. In addition, the controller 180 reads the application table including the color conversion tables from the non-volatile memory 140 or the CRUM 165. The controller 180 then reads a target color conversion table (i.e., the one or more color conversion tables to be applied in the color conversion process) from the color conversion table group(s) stored in the CRUM memory 165 according to the application table including the color conversion tables. The target color conversion table is applied during the color conversion process performed by the color conversion processor 170.

The controller 180 reads the specification information of the printer 100 from the non-volatile memory 140 or the CRUM 165. Additionally, the controller 180 can read the application table including the color-matching tables (see FIG. 2) from the non-volatile memory 140 or the CRUM 165. The controller 180 selects the target color-matching table that corresponds to the specification information of the printer 100 using the application table including the color-matching tables. The controller 180 then downloads the selected target color-matching table from the CRUM 165. The controller 180 then provides the downloaded target color-matching table to the color conversion processor 170, so that the color conversion processor 170 can apply the provided target color-matching table during a color-matching operation.

The controller 180 can collect the usage information (e.g., the residual quantity) of the recording material that is regularly stored in the recording material storage medium 160. The controller 180 controls the collected usage information (e.g., the residual quantity) of the recording material to be stored in the CRUM 165. The collected usage information (e.g., the residual quantity) of the recording material can also be stored in the non-volatile memory 140 of the printer 100 by the controller 180. The controller 180 can therefore read the usage information from the non-volatile memory 140 or the CRUM 165. In addition, the controller 180 reads the application table including the halftone color tables and/or the color lookup tables from the non-volatile memory 140 or the CRUM 165. The halftone color tables and/or the color lookup tables are arranged in the application table to correspond to the usage information of the recording material in the recording material storage medium 160. The controller 180 selects a target halftone color table and/or a target color lookup table that corresponds to the usage information of the recording material. The controller 180 then downloads the target halftone color table and/or the target color lookup table from the CRUM 165. The controller 180 provides the downloaded target halftone color table and/or the target color lookup table to the color conversion processor 170 to be used during halftoning and/or color correction operation(s), respectively.

Referring to FIGS. 1 and 2, the application table 200 including the color-matching tables is stored in the CRUM 165 or the non-volatile memory 140. The application table 200 including the color-matching tables is read by the controller 180 and is used to select the target color-matching table to be downloaded from the CRUM 165. The applicable table 200 including the color-matching tables lists various specification information of the printer 100, such as the PPM (Page Per Minute), the SIZE (the size of the printing paper), the network (network availability), and the double-sided printing (double-sided print function availability). First, second, third, and fourth color-matching tables are included in the application table 200.

For example, if the specification information of the printer 100 indicates that the PPM is 19, the SIZE is A4, no network, and the double-sided printing, the controller 180 selects and reads the second color-matching table to use in the color-matching operation.

FIG. 3 illustrates an application table 300 including the halftone color tables and the color lookup tables according to an embodiment of the present general inventive concept.

Referring to FIG. 1 and FIG. 3, the application table 300 including the halftone color tables and the color lookup tables is stored in the CRUM 165 or the non-volatile memory 140. The application table 300 is read by the controller 180 and is used to select the target halftone color table and the target color lookup table to be downloaded from the CRUM 165. As illustrated in FIG. 3, the residual quantity of the recording material (i.e., the usage information) is divided into three amount categories including 100%-51%, 50%-21%, and 20%-0%. However, a larger or smaller number of amount categories may also be used.

For instance, if the residual quantity of the recording material is 75%, the controller 180 selects and reads a first halftone color table as the target halftone color table and a first color lookup table as the target color lookup table, and applies the first halftone color table and the first color lookup table to the halftoning and color correction operations, respectively. Although FIG. 3 illustrates that the halftone color tables and the color lookup tables are arranged in a single application table 300 and can be selected at the same time, it should be understood that the halftone color tables and the color lookup tables can be arranged in different application tables having different conditions.

Figure 4:
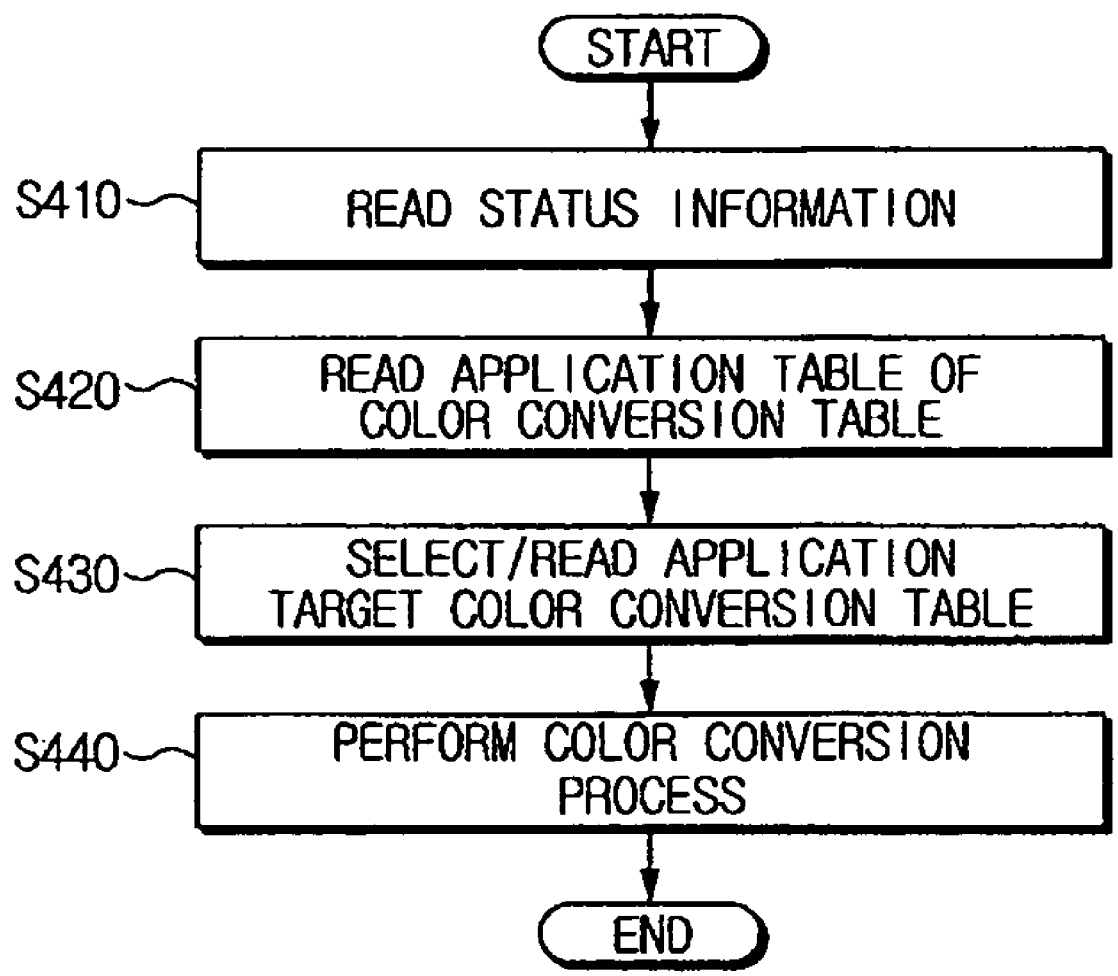
FIG. 4 is a flow chart illustrating a controlling method of a printer according to an embodiment of the present general inventive concept.

FIG. 4 is a flow chart illustrating a control method of a printer according to an embodiment of the present general inventive concept. The control method of FIG. 4 may be performed by the controller 180 of the printer 100 illustrated in FIG. 1. Accordingly, the control method of FIG. 4 is described with reference to FIGS. 1 through 4.

Referring to FIGS. 1 to 4, the controller 180 reads the current status information of the printer 100 from the non-volatile memory 140 or the CRUM 165 (operation S410).

The controller 180 then reads the application table including the color conversion tables from the non-volatile memory 140 or the CRUM 165 (operation S420).

The controller 180 selects the target color conversion table that corresponds to the current status information of the printer 100 from among the color conversion tables in the application table, and the selected target color conversion table is downloaded from the CRUM 165 (operation S430).

Finally, the downloaded target color conversion table is applied to the color conversion process performed by the color conversion processor 170 (operation S440).

Figure 5:
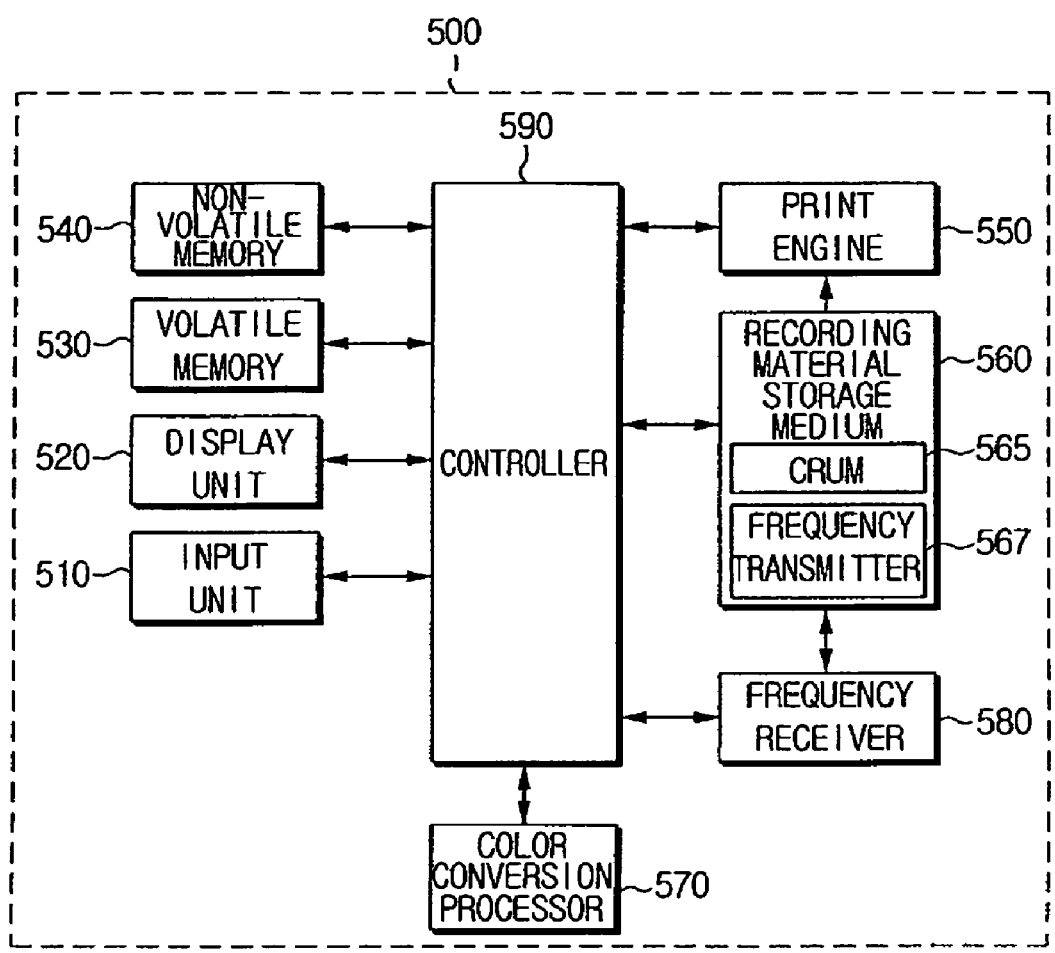
FIG. 5 is a schematic block diagram illustrating a printer according to another embodiment of the present general inventive concept.

FIG. 5 is a schematic block diagram illustrating a printer 500 according to another embodiment of the present general inventive concept. The printer 500 includes some of the same features and/or components as the printer 100 illustrated in FIG. 1. Thus, a detailed description of the features and/or components illustrated in FIG. 1 will not be provided.

The printer 500 includes an input unit 510, a display unit 520, a volatile memory 530, a non-volatile memory 540, a print engine 550, a recording material storage medium 560, a color conversion processor 570, a frequency receiver 580, and a controller 590.

The recording material storage medium 560 includes a CRUM 565 and a frequency transmitter 567.

The CRUM 565 according to the present embodiment stores information about the recording material storage medium, such as an authenticity of the recording material storage medium 560, a model name, etc.

If the recording material storage medium 560 is installed inside the printer 500, the frequency transmitter 567 transmits the information about the recording material storage medium 560 in the CRUM 565 at a predetermined frequency. This information is received by the frequency receiver 580. In other words, since the recording material storage medium 560 is installed inside the printer 500, the frequency transmitter 567 and the frequency receiver 580 are installed at positions where they can transmit/receive the predetermined frequency. RFID (Radio Frequency Identification) technology can be utilized for frequency transmission/receiving between the frequency transmitter 567 and the frequency receiver 580. A barcode and a barcode reader may be used as the frequency transmitter 567 and the frequency receiver 580, respectively, to read the information using optical characteristics of the barcode.

The recording material storage medium 560 may be considered "authentic" if it is provided by a particular manufacturer and/or for a particular image forming device type. For example, the particular manufacturer may be the same manufacturer of the printer 500. More specifically, the recording material storage medium 560 can be referred to as "authentic" if it includes the CRUM 565 and is capable of detecting information about the recording material (e.g., the usage information). Additionally, an "authentic" recording material storage medium may not be an imitation recording material storage medium adapted to work with the printer 500. Alternatively, an "authentic" recording material storage medium may comprise a specific recording material storage medium type.

The controller 590 can determine whether the recording material storage medium 560 is an authentic product based on the information about the recording material storage medium 560 being transmitted. In addition, the controller 590 can determine whether the recording material storage medium 560 is usable only with the printer 500 using the transmitted information about the recording material storage medium 560 and the current status information of the printer 500 stored in the CRUM 565 or the non-volatile memory 540.

If the recording material storage medium 560 is determined to be an authentic product and is usable only with the printer 500, the controller 590 downloads the target color conversion table that corresponds to the current status information of the printer 500 from the color conversion table group stored in the CRUM 565. The downloaded target color conversion table is then applied to the color conversion process performed by the color conversion processor 570.

The color-matching table group may be used as the color conversion table group, the specification information of the printer 500 may be used as the current status information of the printer 500, and the application table including the color-matching tables may be used as the application table including the color conversion tables.

On the other hand, if the installed recording material storage medium 560 is either not an authentic product or is not usable only with the printer 500, the controller 590 controls the color conversion processor 570 to perform the color conversion process with a default color conversion table.

Figure 6:
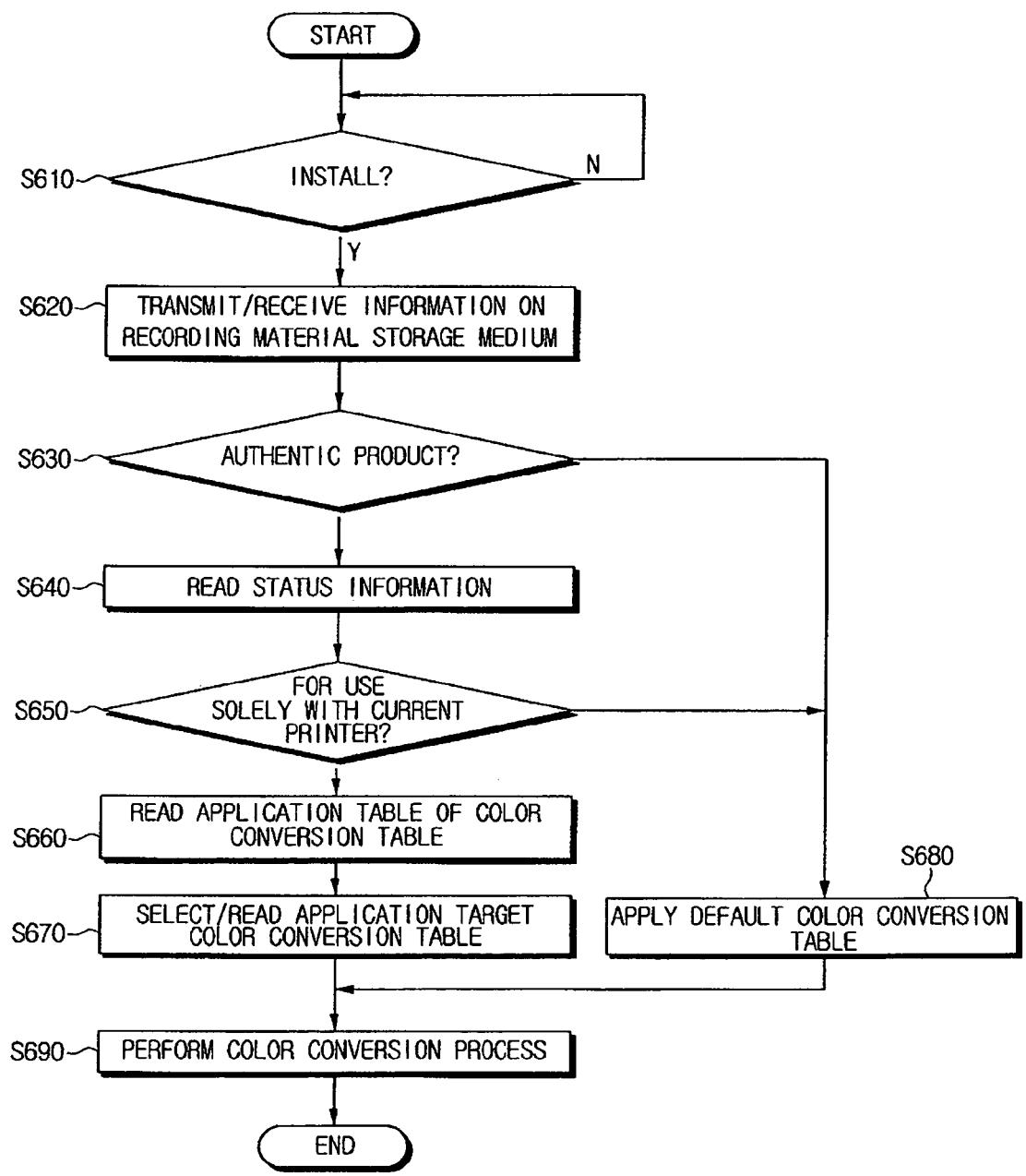
FIG. 6 is a flow chart illustrating a controlling method of a printer according to an embodiment of the present general inventive concept.

FIG. 6 is a flow chart illustrating a control method of a printer according to an embodiment of the present general inventive concept. The control method of FIG. 6 can be performed by the controller 590 of the printer 500 illustrated in FIG. 5. Accordingly, the control method of FIG. 6 is described with reference to FIGS. 5 and 6.

Referring to FIGS. 5 and 6, when a user installs the recording material storage medium 560 inside the printer 500 (operation S610), the information about the recording material storage medium 560 in the CRUM 565 is transmitted from the frequency transmitter 567 to the frequency receiver 580 (operation S620).

Based on the received information about the recording material storage medium 560, the controller 590 determines whether the recording material storage medium 560 is an authentic product (operation S630).

If the recording material storage medium 560 is determined to be an authentic product, the controller 590 reads the current status information of the printer 500 from the non-volatile memory 540 or the CRUM 565 (operation S640).

Based on the read current status information of the printer 500 and the received information about the recording material storage medium 560, the controller 590 determines whether the recording material storage medium 560 is usable only with the printer 500 (operation S650).

If the recording material storage medium 560 is determined to be usable only with the printer 500 (operation S650), the controller 590 reads the application table including the color conversion tables from the non-volatile memory 540 or the CRUM 565 (operation S660).

Using the current status information of the printer 500 and the read application table including the color conversion tables, the controller 590 selects and reads the target color conversion table (operation S670). The target color conversion table is applied to the color conversion process performed by the color conversion processor 570 (operation S690).

If the recording material storage medium 560 is either not an authentic product (operation S630) or is not usable only with the printer 500 (operation S650), the default color conversion table is applied during the color conversion process performed by the color conversion processor 570 (operations S680 and S690).

Figure 7:
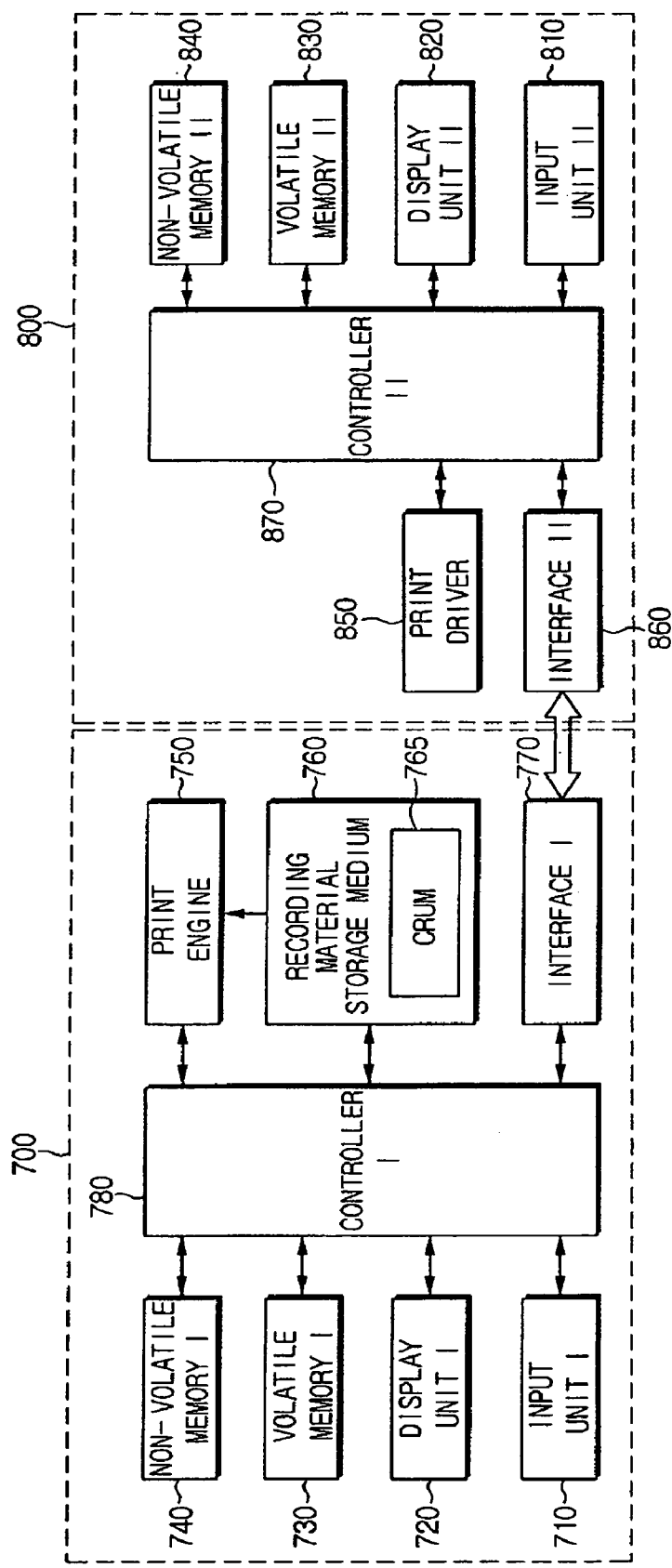
FIG. 7 is a schematic block diagram illustrating a printing system according to an embodiment of the present general inventive concept.

FIG. 7 is a schematic block diagram illustrating a printing system according to an embodiment of the present general inventive concept.

Although the color conversion process is performed by the color conversion processors 170 and 570 of the printers 100 and 500 illustrated in FIGS. 1 and 5, respectively, the color conversion process of the present embodiment is performed by a printer driver 850 of a host device 800.

Referring to FIG. 7, the printing system includes a printer 700 and the host device 800.

The printer 700 includes a first input unit 710, a first display unit 720, a first volatile memory 730, a first non-volatile memory 740, a print engine 750, a recording material storage medium 760, a first interface 770, and a first controller 780. The recording material storage medium 760 includes a CRUM 765. The first interface 770 is provided to interface the printer 700 and the host device 800 using either a wired connection or a wireless connection.

According to the present embodiment, a target color conversion table is transmitted from the printer 700 to the host device 800 through the first interface 770. Additionally, print data produced by applying the target color conversion table in the color conversion process is transmitted by the host device 800 through the first interface 770 to the printer 700.

The first controller 780 reads the current status information of the printer 700 from the first non-volatile memory 740 or the CRUM 765.

Additionally, the first controller 780 reads the application table including the color conversion tables from the first non-volatile memory 740 or the CRUM 765.

The first controller 780 then selects the target color conversion table that corresponds to the current status information of the printer 700 from the application table including the color conversion tables, and downloads the selected target color conversion table from the CRUM 765.

The downloaded target color conversion table is then transmitted to the host device 800 through the first interface 770 by the first controller 780.

The host device 800 illustrated in FIG. 7 includes a second input unit 810, a second display unit 820, a second volatile memory 830, a second non-volatile memory 840, a printer driver 850, a second interface 860, and a second controller 870. The host device 800 may be a personal computer, a portable PC, a PDA, or any other information processing device.

A user can input a user command to the second input unit 810. The second input unit 810 may include a keyboard, a mouse, etc. A user command signal input through the second input unit 810 is provided to the second controller 870, and the second controller 870 controls the host device 800 in response to the user command signal. The second display unit 820 displays all types of user notification messages, in response to the user command and/or the control of the second controller 870. The second volatile memory 830 temporarily stores data that is generated during operation of the host device 800.

The second non-volatile memory 840 stores a second control program to control overall operation of the host device 800. The second non-volatile memory 840 may store a color conversion table. For example, the second non-volatile memory 840 may store the target color conversion table received from the printer 700.

The printer driver 850 converts a printing document (i.e., a document to be printed) prepared by an application program executed on the host device 800 into readable print data that the printer 700 can recognize. In particular, the printer driver 850 may perform the color conversion process on the print data using the color conversion table stored in the second non-volatile memory 840. If the target color conversion table is provided by the printer 700 to the second controller 870, the printer driver 850 performs the color conversion process by applying the provided target color conversion table.

The printer driver 850 also provides a GUI (Graphic User Interface) through which the user can set one or more functions relating to the printer 700. The printer driver 850 may provide the GUI to enable the user to change specification information of the printer 700. The specification information of the printer 700 input from the printer driver 850 is provided to the printer 700 through the second and the first interface 860 and 770. The first controller 780 then replaces pre-stored specification information of the printer 700 stored in the first non-volatile memory 740 with the specification information of the printer 700 input through the GUI.

The second interface 860 is connected to the first interface 770 of the printer 700, and functions as a channel for information exchange between the printer 700 and the host device 800.

According to the present embodiment, the target color conversion table is transmitted from the printer 700 through the second interface 860 to the host device 800. Additionally, the second interface 860 transmits the print data, which is produced by applying the target color conversion table in the color conversion process, to the printer 700. If the printer 700 receives the print data which has been produced using the target color conversion table, the printer 700 may not convert the print data to be printed on a printing medium, since the target color conversion table has been selected according to the current status information of the printer 700.

The second controller 870 controls and manages overall operation of the host device 800 according to the second control program stored in the second non-volatile memory 840.

Additionally, when the target color conversion table is transmitted from the printer 700, the second controller 870 provides the transmitted target color conversion table to the printer driver 850.

Figure 8:
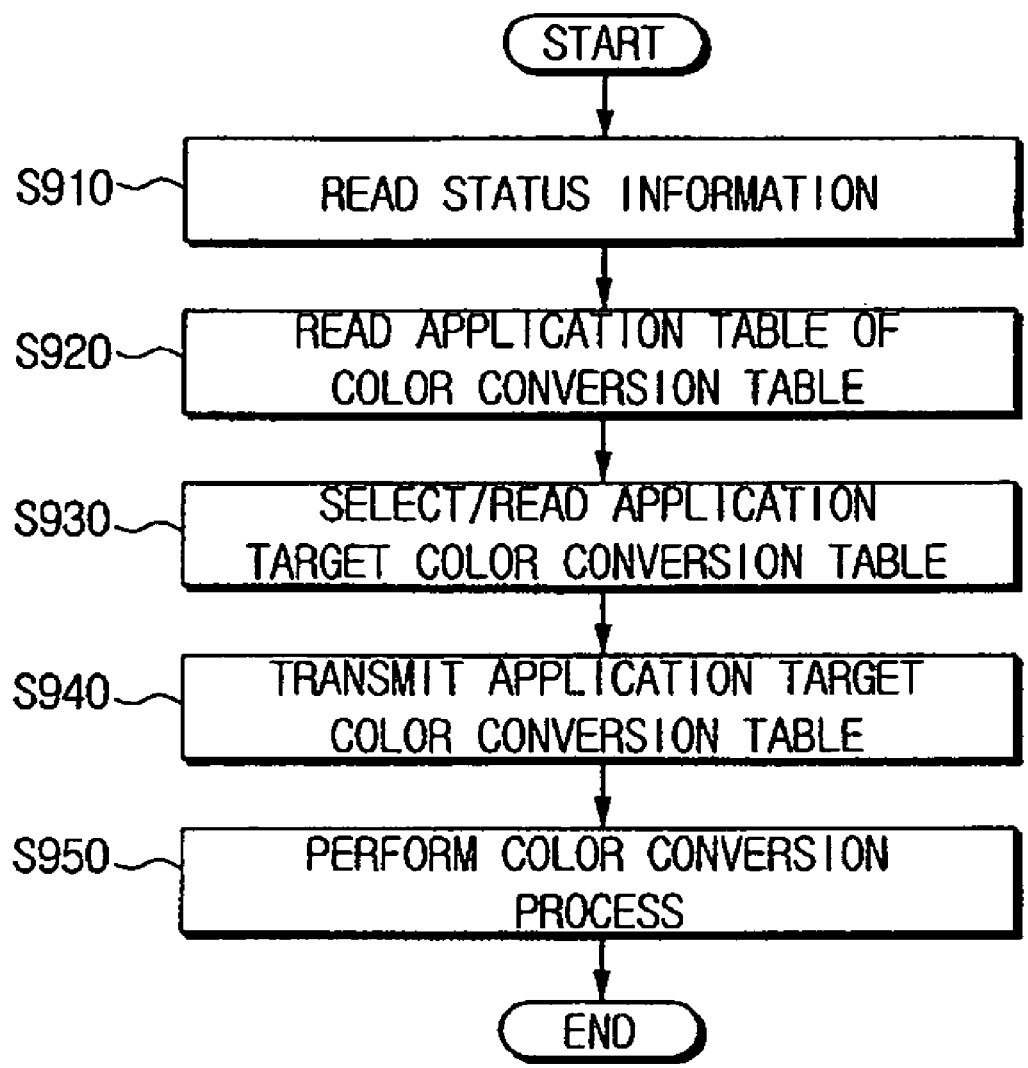
FIG. 8 is a flow chart illustrating a controlling method of a printing system according to an embodiment of the present general inventive concept.

FIG. 8 is a flow chart illustrating a control method of a printing system according to an embodiment of the present general inventive concept. The control method of FIG. 8 may be performed by the first and second controllers 780 and 870 of the printer 700 and the host device 800 illustrated, respectively, in FIG. 7. Accordingly, the control method of FIG. 8 is described with reference to FIGS. 7 and 8.

Referring to FIG. 7 and FIG. 8, the first controller 780 reads the current status information of the printer 700 from the first non-volatile memory 740 or the CRUM 765 (operation S910).

The first controller 780 then reads the application table including the color conversion tables from the first non-volatile memory 740 or the CRUM 765 (operation S920).

The first controller 780 selects the target color conversion table that corresponds to the current status information of the printer 700 from among color conversion tables in the application table, and downloads the selected target color conversion table from the CRUM 765 (operation S930).

The downloaded target color conversion table is then transmitted to the host device 800 through the first and the second interfaces 770 and 860 (operation S940).

The second controller 870 then provides the transmitted target color conversion table to the printer driver 850, and the printer driver 850 applies the provided target color conversion table in the color conversion process (operation S950).

The present general inventive concept may be embodied in hardware, software, or a combination thereof. For example, the present general inventive concept may be embodied by a computer running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present general inventive concept may be embodied as a computer-readable medium having a computer-readable program code to cause a number of computer systems connected via a network to effect distributed processing.

As described above, according to various embodiments of present general inventive concept, a color conversion table may be applied by an image forming device (e.g., a color image forming device) and a control method thereof can be based on specification information of the image forming device such that optimum print quality is guaranteed. Moreover, since the color conversion table used to provide the optimum print quality can be downloaded and applied when a recording material storage medium is usable only with a printer in use, more users are encouraged to use authentic products as the recording material storage medium.

In addition, because the color conversion table is applied based on a state of exhaustion of a replaceable unit, a user can more actively respond to an exhausted replaceable unit. In this manner, despite an expiring lifespan of the replaceable unit, the user can still be provided with the optimum print quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device having a recording material stored in a recording material storage medium, the device comprising:
   a customer replaceable unit memory (CRUM) associated with the recording material storage medium to store a color conversion table group including at least one color conversion table that corresponds to at least one status information of the image forming device; and
   a controller to determine current status information of the image forming device, to read a target color conversion table from among the color conversion table group according to the determined current status information, and to execute a color conversion process by applying the target color conversion table.

2. The device according to claim 1, wherein the color conversion table group comprises at least one of an RGB-CMYK color-matching table group, a halftone color table group, and a color lookup table group.

3. The device according to claim 1, wherein the status information comprises at least one of specification information of the image forming device and usage information of replaceable units installed in the image forming device.

4. The device according to claim 3, wherein the specification information of the image forming device comprises at least one of a PPM (Page Per Minute) number, a size of printing paper, an availability of a network function, an availability of a double sided printing function, a resolution, a print density, and an image mode.

5. The device according to claim 3, further comprising:
   an input unit to receive a command to change the specification information of the image forming device.

6. The device according to claim 1, wherein the CRUM further stores information about the recording material storage medium including at least one of an authenticity thereof and a model name thereof, and the controller determines whether the recording material storage medium is usable only with the image forming device based on the determined current status information, and if the recording material storage medium is determined to be usable only with the image forming device the controller reads the target color conversion table.

7. The device according to claim 6, wherein:
   the recording material storage medium comprises a transmitter to transmit the information about the recording material storage medium, if the recording material storage medium is installed in the image forming device; and
   the image forming device further comprises: a receiver to receive the information about the recording material storage medium from the transmitter and to provide the received information to the controller.

8. An image forming device, comprising:
   a replaceable storage medium containing a recording material and having a replaceable memory to store a plurality of color conversion tables; and
   a controller to select one of the plurality of color conversion tables according to status information to convert an image signal to be printed.

9. An image forming system, comprising:
   a memory attachable to a recording material storage medium to store a plurality of color conversion tables each corresponding to at least one of specification information and usage information; and
   a controller to select one of the plurality of color conversion tables as a target color conversion table according to status information of at least one of the specification information and usage information to convert print data to be printed on a sheet of paper.

10. An image forming system, comprising:
    a memory to store a plurality of color conversion tables corresponding to reference status information; and
    a controller to transmit at least one of the plurality color conversion tables to an external device upon request of one of the plurality of color conversion tables according to current status information thereof from the external device, to receive print data relating to the at least one of the plurality of color conversion tables from the external device, and to print the received print data on a recording medium without conversion.

11. An image forming device, comprising:
    at least one memory attachable to a recording material storage medium to store current status information about the image forming device and a plurality of color conversion tables that correspond to a plurality of possible statuses of the image forming device; and
    a controller to select one of the plurality of color conversion tables as a target color conversion table to be applied in a color conversion process according to the current status information.

12. A controlling method of an image forming device having a recording material stored in a recording material storage medium, the method comprising:
    determining current status information of the image forming device;
    based on the determined current status information, reading from a customer replaceable unit memory (CRUM) associated with the recording material storage medium a target color conversion table from among a color conversion table group that includes at least one color conversion table that corresponds to at least one status information of the image forming device; and
    performing a color conversion process by applying the read target color conversion table.

13. The method according to claim 12, further comprising:
    if the recording material storage medium is installed in the image forming device, determining whether the recording material storage medium is usable only with the image forming device based on information about the recording material storage medium stored in the CRUM including at least one of an authenticity thereof and a model name thereof; and
    if the recording material storage medium is determined to be usable only with the image forming device, reading the target color conversion table.

14. The method according to claim 13, further comprising:
    if the recording material storage medium is determined not to be usable only with the image forming device, performing the color conversion process by applying a predetermined default color conversion table.

15. A method of controlling an image forming device, the method comprising:
    storing current status information about the image forming device and a plurality of color conversion tables that correspond to a plurality of possible statuses of the image forming device in a memory unit attachable to a recording material storage medium of the image forming device; and selecting a target color conversion table to be applied in a color conversion process according to the current status information.

16. A host device in communication with an image forming device, the host device comprising:

a second interface to receive a target color conversion table based on a determined current status information of the image forming devide, and the target color conversion table is included in a color conversion table group comprising at least one color conversion table that corresponds to at least one status information of the image forming device and is stored in a customer replaceable memory (CRUM) associated with a recording material storage medium of the image forming device; and a printer driver to perform a color conversion process by applying the received target color conversion table.

17. The host device according to claim 16, wherein the color conversion table group comprises at least one of an RGB-CMYK color-matching table group, a halftone color table group, and a color lookup table group.

18. The host device according to claim 16, wherein teh status information comprises at least one of specification information of the image forming device and usage information of replaceable units installed in the image forming device.

19. The host device according to claim 18, wherein the specification information of the image forming device comprises at least one of a PPM (Page Per Minute) number, a size of printing paper, an availability of a network function, an availability of a double sided printing function, a resolution, a print density, and an image mode.

20. The host device according to claim 19, wherein the printer driver provides a graphic user interface (GUI) that enables a user to change the specification information of the image forming device.

21. A controller method of a host device in communication with an image forming device, the method comprisin:

receiving a target color conversion table based on determined current status information of the image forming device, and the target color conversion table is included in a color conversion table group comprising at least one color conversion table that corresponds to at least one status information of the image forming device and is stored in a customer replaceable memory (CRUM) associated with a recording material storage medium of the image forming device; and performing a color conversion process by applying the received target color conversion table.

22. The method according to claim 21, wherein the status information comprises at least one of specification information of the image forming device and usage information of replaceable units installed in the image forming device.

23. The method according to claim 22, wherein the specification information of the image forming device comprises at least one of a PPM (Page Per Minute) number, a size of printing paper, an availability of a network function, an availability of a double sided printing function, a resolution, a print density, and an image mode.

24. An image forming system, comprising:

an image forming device to read and transmit a target color conversion table based on determined current status information of the image forming device, and the target color conversion table is included in a color conversion table group comprising at least one color conversion table that correponds to at least one status information of the image foming device and is stored in a customer replaceable memory (CRUM) associated with a recording material storage medium of the image forming device; and a host device to perform a color conversion process by applying the transmitted target color conversion table.

25. The system according to claim 24, wherein the image forming device comprises:

the customer replaceable unit memory (CRUM) associated with the recording material storage medium to store the color conversion table group including the at least one color conversion table that corresponds to the at least one status information of the image forming device; and a controller to determine the current status information of the image forming device, to read the target color conversion table from among the color conversion table group according to the determined current status information, and to transmit the target color conversion table to the host device.

26. The system according to claim 24, wherein the host device comprises:

a printer driver perform the color conversion process by applying the transmitted target color conversion table.

27. A controlling method of an image forming system including an image forming device having a recording material stored in a recording material storage medium and a host device in communication with the image forming device, the method comprising:

determining current status information of the image forming device;

based on the determined current status information, reading from a customer replaceable unit memory (CRUM) associated with the recording material storage medium a target color conversion table from among a color conversion table group that includes at least one color conversion table that corresponds to at least one status information of the image forming device;

transmitting the read target color conversion table from the image forming devide to the host device; and performing a color conversion process by applying the transmitted target color conversion table.

28. The method according to claim 27, further comprising:

if the recording material storage medium is installed in the image forming device, determining whether the recording material storage medium is usable only with the image forming device according to information about the recording material storage medium stored in the CRUM including at least one of an authenticity thereof and a model name thereof; and if the recording material storage medium is usable only with the image forming device, reading the target color conversion table.

29. The method according to claim 28, further comprising:

if the recording material storage medium is not usable only with the image forming device, performing the color conversion process by applying a predetermined default color conversion table.

30. A computer readable medium containing executable code to control an image forming device, the medium comprising:

a first executable code to store current status information about the image forming device and a plurality of color conversion tables that correspond to a plurality of possible statuses of the image forming device in a memory unit attachable to a recording material storage medium of the image forming device; and a second executable code to select a target color conversion table to be applied in a color conversion process according to the current status information.

31. An image forming system, comprising:

a recording material storage medium having a replaceable memory to store a plurality of color conversion tables and current status information of the image forming system; and a controller to select one of the plurality of color conversion tables according to the current status information and to convert an image signal to be printed according to the selected color conversion table.

* * * * *

UNITED STATES PATENT AND TRADEMARK OFFICE
CERTIFICATE OF CORRECTION

PATENT NO. : 7,663,781 B2  Page 1 of 1
APPLICATION NO. : 11/268465
DATED : February 16, 2010
INVENTOR(S) : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-eighth Day of December, 2010

David J. Kappos
*Director of the United States Patent and Trademark Office*